US010644928B2

(12) United States Patent
Jang et al.

(10) Patent No.: US 10,644,928 B2
(45) Date of Patent: May 5, 2020

(54) DEVICE, SYSTEM, AND METHOD TO PERFORM REAL-TIME COMMUNICATION

(71) Applicant: HANWHA TECHWIN CO., LTD., Seongnam-si (KR)

(72) Inventors: Junghwan Jang, Changwon-si (KR); Jongho Lee, Changwon-si (KR)

(73) Assignee: HANWHA TECHWIN CO., LTD., Changwon-si (KR)

( * ) Notice: Subject to any disclaimer, the term of this patent is extended or adjusted under 35 U.S.C. 154(b) by 40 days.

(21) Appl. No.: 15/685,538

(22) Filed: Aug. 24, 2017

(65) Prior Publication Data

US 2018/0324024 A1   Nov. 8, 2018

Related U.S. Application Data

(60) Provisional application No. 62/500,390, filed on May 2, 2017.

(51) Int. Cl.
*G06F 15/16* (2006.01)
*H04L 29/06* (2006.01)
*H04L 29/08* (2006.01)

(52) U.S. Cl.
CPC .. *H04L 29/06176* (2013.01); *H04L 29/08081* (2013.01); *H04L 65/602* (2013.01); *H04L 65/605* (2013.01); *H04L 65/608* (2013.01); *H04L 67/00* (2013.01); *H04L 67/02* (2013.01)

(58) Field of Classification Search
CPC ......... H04L 29/06176; H04L 29/08081; H04L 65/602; H04L 65/605; H04L 65/608; H04L 67/02

USPC ......................................................... 709/204
See application file for complete search history.

(56) References Cited

U.S. PATENT DOCUMENTS

| 7,676,590 B2 | 3/2010 | Silverman et al. |
| 2013/0163580 A1 | 6/2013 | Vass |
| 2015/0032857 A1* | 1/2015 | Hamm ........... H04N 21/234327 709/219 |
| 2015/0350288 A1 | 12/2015 | Verma et al. |
| 2016/0119399 A1 | 4/2016 | Glass |
| 2016/0198161 A1* | 7/2016 | Samuelsson ..... H04N 21/23439 375/240.27 |
| 2017/0006312 A1* | 1/2017 | Yang ................... H04N 19/895 |

(Continued)

FOREIGN PATENT DOCUMENTS

| KR | 10-2016-0116493 | 10/2016 |
| KR | 10-2017-0013873 | 2/2017 |
| WO | 2005/111835 | 11/2005 |

OTHER PUBLICATIONS

The Extended European Search Report dated Dec. 7, 2017, issued in European Patent Application No. 17194662.7.

*Primary Examiner* — Alan S Chou
(74) *Attorney, Agent, or Firm* — H.C. Park & Associates, PLC

(57) ABSTRACT

A device, system and method of performing real-time communication with an external web browser signals an external web browser to initiate real-time communication over a network, packetizes encoded media data based on a given real-time network protocol after the signaling is performed, depacketizes the packetized media data to obtain the encoded media data, and performs the real-time communication by transporting the encoded media data to an external web browser over the network.

20 Claims, 14 Drawing Sheets

(56) References Cited

U.S. PATENT DOCUMENTS

2017/0078359 A1 3/2017 Herrero
2018/0309688 A1* 10/2018 Sarker .................. H04W 28/02

* cited by examiner

DEVICE, SYSTEM, AND METHOD TO PERFORM REAL-TIME COMMUNICATION

CROSS-REFERENCE TO RELATED APPLICATIONS

This application claims priority from and the benefit of the U.S. Provisional Patent Application No. 62/500,390, filed on May 2, 2017, which is hereby incorporated by reference for all purposes as if fully set forth herein.

BACKGROUND

Field

The invention relates generally to devices and methods for providing encoded multimedia communications over a network, and more particularly, to a source device, network system and a method of communicating encoded media data in real time, e.g., via web real-time communication, having improved encoding efficiency.

Discussion of the Background

Some communications service providers and enterprises have deployed real-time communications applications based on a protocol known as web real-time communication (WebRTC). WebRTC is an open Internet standard for embedding real-time multimedia communications capabilities (e.g., voice calling, video chat, peer to peer file sharing, etc.) into a web browser and enables browser to browser real-time communications between a source device and a sink device. For any device with a supported web browser, WebRTC can use application programming interfaces (APIs) to equip the device with the real-time communication capabilities without requiring users to download plug-in software. WebRTC establishes a connection between two web browsers and creates a channel for the exchange of data between the peers.

The sink device may have enough hardware resources to process media data received from the source device when performing WebRTC. For example, the sink device having a high-performance processor, such as a portable computer, a personal digital assistant (PDA), and a smart phone, may smoothly play the media data even though the sink device decodes the media data via software. On the other hand, the source device may not have hardware resources not to process media data. For example, the source device may have a low-performance processor and may not smoothly or efficiently encode the media data to be transported, if the source device encodes the media data via software. In this case, the overall operation and/or performance of the source device and the WebRTC may be deteriorated and reduce the quality and/or efficiency and/or of the desired real time communication.

The above information disclosed in this Background section is only for enhancement of understanding of the background of the inventive concepts, and, therefore, it may contain information that does not form the prior art that is already known to a person of ordinary skill in the art.

SUMMARY

Source devices and network systems constructed according to, and methods employing the, principles of the invention improve the efficiency and/or quality of real time communications, such as WebRTC. This may be achieved through source devices having improved encoding efficiency. For example, a web real-time communicator of a source device constructed according to the principles of the invention receives encoded media data through a streaming server.

Devices and systems constructed according the principles of the invention may also enable peer to peer WebRTC without requiring a user of a sink device to download and install plug-in software.

Additional aspects will be set forth in the detailed description which follows, and, in part, will be apparent from the disclosure, or may be learned by practice of the inventive concepts.

According to one aspect of the invention, a method of performing real-time communication with an external web browser includes the steps of: signaling an external web browser to initiate real-time communication over a network; packetizing encoded media data based on a given real-time network protocol after the signaling is performed; depacketizing the packetized media data to obtain the encoded media data; and performing the real-time communication by transporting the encoded media data to an external web browser over the network.

The step of depacketizing of the packetized media data may include obtaining the encoded media data from a payload of the packetized media data.

The method may further include the step of reading set information stored in an internal storage to determine the given real-time network protocol. The payload of the packetized media data may be identified depending on the determined real-time network protocol.

The step of performing of the real-time communication may include: repacketizing the encoded media data; and transporting the repacketized media data including the encoded media data to the external web browser.

The method may further include the step of encoding the media source to generate the encoded media data by using a hardware media encoder.

The real-time communication may include web real-time communication (WebRTC).

The given real-time network protocol may be one of a real-time transport protocol (RTP), a real-time streaming protocol (RTSP), and a real-time messaging protocol (RTMP).

The encoded media data may be based on one of video compression standards H.263, H.264, H.265, VP8, VP9, and AOMedia Video 1 (AV1).

According to another aspect of the invention, a method of performing a web real-time communication with an external web browser includes the steps of: signaling an external web browser to initiate web real-time communication; requesting a packetized media data from a streaming server based upon the response to the signaling step, the packetized media data including media data that is encoded based on a given media compression standard; and performing the web real-time communication by transporting the encoded media data obtained from the packetized media data to the external web browser.

The method may further include the step of receiving information of a real-time network protocol corresponding to the streaming server from an external source device associated to the streaming server. The encoded media data may be obtained from a payload of the packetized media data, and the payload of the packetized media data may be identified depending on the received information.

The method may further include the step of reading set information stored in an internal storage to determine a real-time network protocol corresponding to the streaming server. The encoded media data may be obtained from a payload of the packetized media data, and the payload of the packetized media data may be identified depending on the determined real-time network protocol.

The packetized media data may be requested when the signaling result indicates that the external web browser supports the given media compression standard.

The given media compression standard may be one of video compression standards H.263, H.264, H.265.

The method may further include the step of receiving the media source when the signaling result indicates that the external web browser supports another media compression standard different from the given media compression standard.

The method may further include the steps of: encoding the media source based on the other media compression standard; and performing the web real-time communication by transporting the encoded media source based on the other media compression standard to the external web browser.

According to still another aspect of the invention, a source device to perform web real-time communication with an external web browser includes: a media encoder configured to process a media source to generate encoded media data; and at least one processor configured to: signal an external web browser; packetize the encoded media data based on a given real-time network protocol based upon the response to signaling the external web browser; and depacketize the packetized media data to obtain the encoded media data for the web real-time communication.

The encoded media data may be based on a first media compression standard. The at least one processor may be configured to packetize the encoded media data when the signaling result indicates that the external web browser supports the first media compression standard.

The at least one processor may be further configured to receive the media source to perform the web real-time communication when the signaling result indicates that the external web browser supports a second media compression standard different from the first media compression standard.

The at least one processor may be further configured to: encode the received media source based on the second media compression standard; and perform the web real-time communication using the encoded media data based on the second media compression standard.

The at least one processor may be configured to: obtain the encoded media data from a payload of the packetized media data; and transport the encoded media data to the external web browser to perform the web real-time communication.

According to still yet another aspect of the invention, a source device to perform web real-time communication with an external web browser includes: a media encoder to process a media source to generate encoded media data; a streaming server to support packetization of the encoded media data based on a given real-time network protocol; and a web real-time communicator to signal the external web browser for the web real-time communication, and to request the packetized media data from the streaming server based on the response to signaling the external web browser. The web real-time communicator performs the web real-time communication using the packetized media data.

According to the principles of the invention, a source device and a method of performing web real-time communication have improved encoding efficiency and compatibility.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
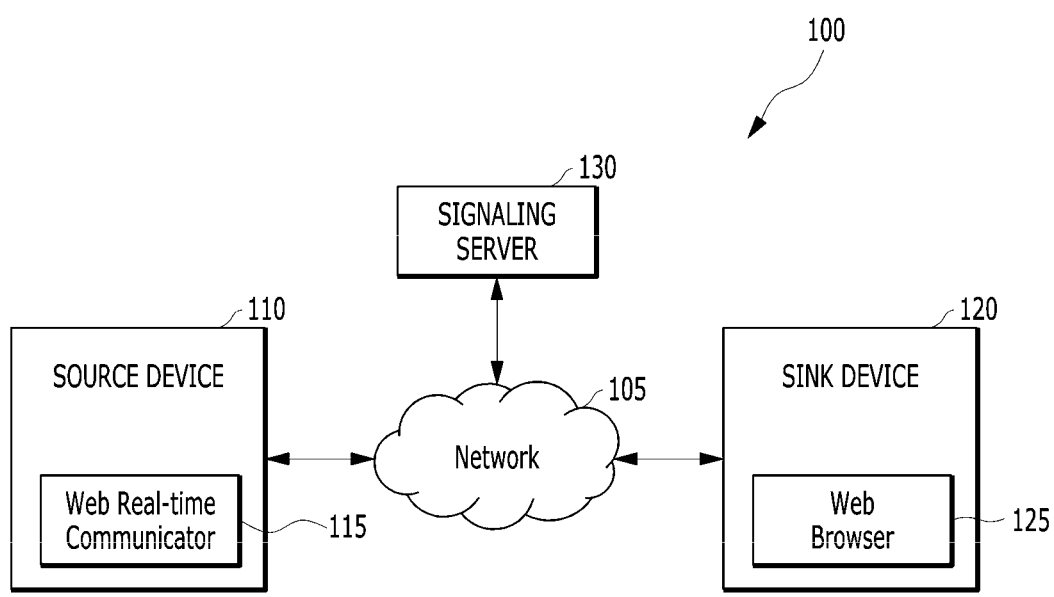
FIG. 1 is a block diagram illustrating an exemplary embodiment of a network system constructed according to the principles of the invention for executing WebRTC between a source device and a sink device.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram illustrating an exemplary embodiment of a network system 100 constructed according to the principles of the invention for executing WebRTC between a source device 110 and a sink device 120. The network system 100 may include or implement a plurality of devices, servers, and/or software components that operate to perform various methodologies according to the described principles and exemplary embodiments. It can be appreciated that the illustrative devices and/or servers illustrated in FIG. 1 may be deployed in other ways and that the operations and services provided by the devices and/or servers may be combined or separated for the described exemplary embodiments and may be performed by a greater number or fewer number of devices and/or servers. One or more devices and/or servers may be operated and/or maintained by the same or different entities.

Referring to FIG. 1, the network system 100 may include a network 105, the source device 110, the sink device 120, and a signaling server 130. The source device 110 and the sink device 120 may each include one or more processors, memories, and other appropriate components for executing instructions such as program codes and/or data stored on one or more computer readable mediums to implement various applications and steps described herein. For example, the instructions may be stored in one or more computer readable media internal and/or external to various components of the network system 100.

The source device 110 and the sink device 120 are coupled to the network 105. The network 105 may be at least one of public network, one or more private networks, wire networks, wireless networks, other appropriate types of networks, and combinations thereof that may be accessible by the source device 110, the sink device 120, and the signaling server 130. The source device 110 and the sink device 120 may have at least one of wire communication capabilities and wireless communication capabilities and may communicate each other through the network 105. The source device 110 and the sink device 120 perform peer to peer communication in real time, such as web real-time communication (WebRTC). The source device 110 transports media data, which includes at least one of audio data and video data, including but not limited to multimedia data, to the sink device 120 participating in a particular media share session. The media data may be played at the display of the sink device 120. That is, the sink device 120 may render the received media data on its display and audio equipment.

For example, the source device 110 may include at least one of an internet protocol (IP) camera, a network video recorder, a web camera, and the like that may transport the media data to the sink device 120 through the network 105. For example, the sink device 120 may include a portable computer, a personal digital assistant (PDA), a smart phone, a tablet PC, a video gaming device, a television, a desktop computer, a monitor, a projector, and the like that may play the received media data on its display and audio equipment.

Figure 5:
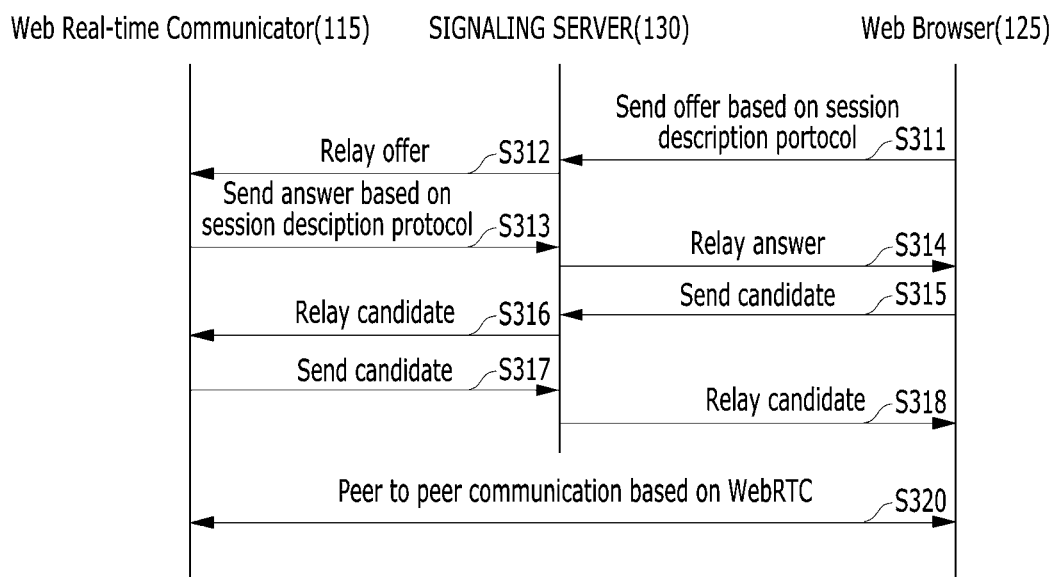
FIG. 5 is a flowchart illustrating exemplary signaling that may be performed to carry out peer to peer WebRTC.

The source device 110 includes a web real-time communicator 115 performing WebRTC with a web browser 125 of the sink device 120. The web real-time communicator 115 may engage in signaling with the web browser 125 of the sink device 120 through the signaling server 130 to initiate WebRTC. For example, the web real-time communicator 115 may define the media share session of the peer to peer connection of WebRTC via the signaling. During the signaling, the signaling server 130 may relay messages from the source device 110 to the sink device 120, and may also relay messages from the sink device 120 to source device 110, such as shown in FIG. 5 discussed below. During the signaling, the web real-time communicator 115 may exchange media capabilities, such as available media compression standards and bit rates for encoding and decoding the media data, resolutions of the media data, etc., with the web browser 125 of the sink device 120. During the signaling, the web real-time communicator 115 may also exchange candidates for identifying the web real-time communicator 115 and the web browser 125 in the network 105, such as IP addresses and ports, with the web browser 125 of the sink device 120.

After the signaling is successfully performed, the web-real time communicator 115 may capture the media data generated by internal components of the source device 110 and may transport the media data in real-time to the web browser 125 of the sink device 120 to perform WebRTC. The web browser 125 may render the received media data on a display and an audio equipment of the sink device 120.

Figure 2:
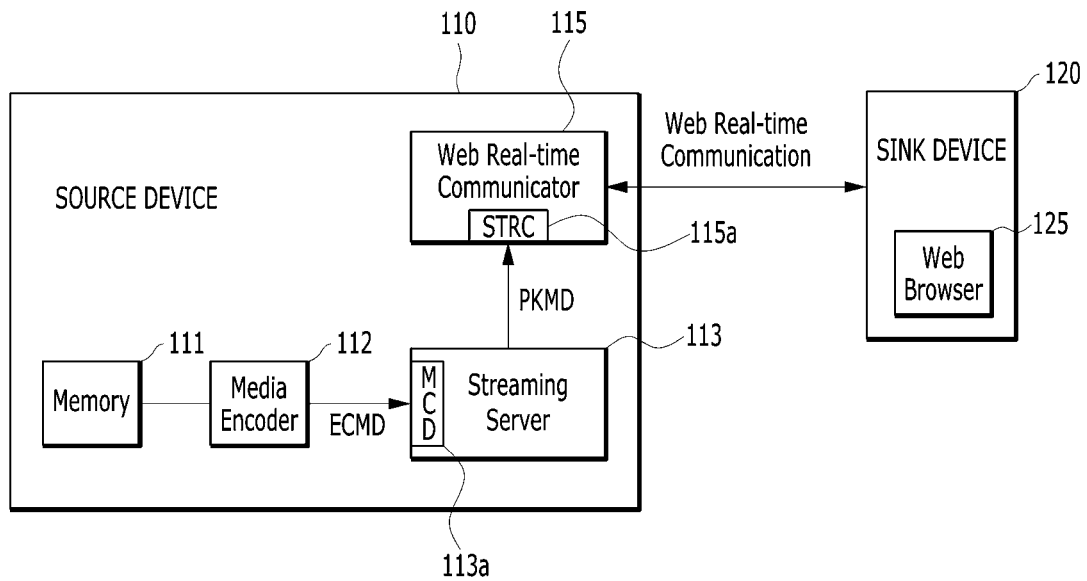
FIG. 2 is a block diagram illustrating an exemplary embodiment of the source device constructed according to the principles of the invention.

FIG. 2 is a block diagram illustrating an exemplary embodiment of the source device 110 constructed according to the principles of the invention.

Referring to FIG. 2, the source device 110 may include a memory 111, a media encoder 112, a streaming server 113, and a web real-time communicator 115.

The memory 111 may be in the form of any memory device or system known or later developed in the art and may store a media source which includes at least one of video source and audio source. The source device 110 may further include at least one camera providing video data and at least one microphone providing audio data. For example, the camera may include an image sensor converting optical signals, which are input through lens, into electrical signals to generate video data. The image sensor may be a semiconductor device such as a charge-coupled device (CCD), a complementary metal oxide semiconductor (CMOS), or the like known or later developed in the art that may convert the optical signals into the electrical signals. For example, the microphone may convert sound into electrical signals to generate audio data. The generated video data and the audio data may be processed by one or more processors of the source device 110 to provide the video source and the audio source.

The media encoder 112 encodes the media source and generates encoded media data ECMD based on a given media compression standard. In one or more exemplary embodiments, the media encoder may encode the media source based on one of video compression standards H.263, H.264, H.265, VP8, VP9, AOMedia Video 1 (AV1), and the like. For instance, the media encoder 112 may be integrated in System on Chip with the memory 111, and may encode the media source stored in the memory 111 to generate an encoded media data ECMD.

The streaming server 113 receives the encoded media data ECMD and packetizes the encoded media data ECMD in response to a request of the web real-time communicator 115. The streaming server 113 may include a media capture driver (MCD) 113a. The media capture driver 113a may request the media encoder 112 to encode the media source and may capture the encoded media data ECMD. The streaming server 113 may packetize the encoded media data ECMD based on a real-time network protocol, such as real-time transport protocol (RTP), real-time streaming protocol (RTSP), real-time messaging protocol (RTMP), and the like. The packetized media data PKMD may be in a certain format corresponding to the real-time network protocol. The packetized media data PKMD may include a header corresponding to the real-time network protocol as well as the encoded media data.

The streaming server 113 may communicate with streaming client servers, such as cloud servers, coupled to the network 105 shown in FIG. 1. The streaming server 113 may packetize the encoded media data ECMD and transport the packetized media data PKMD to the streaming client server for uploading.

The source device 110 further includes the web real-time communicator 115. The web real-time communicator 115 provides WebRTC enabling the source device 110 to perform peer to peer communication with a web browser 125 of the sink device 120. The web browser 125 of the sink device 120 also provides WebRTC enabling the sink device 120 to perform peer to peer communication with the web real-time communicator 115 without downloading and installing plug-in software.

According to the illustrated embodiment, the web real-time communicator 115 receives the packetized media data PKMD from the streaming server 113 and performs WebRTC using the packetized media data PKMD. The web real-time communicator 115 may perform WebRTC after the signaling with the web browser 125 is successfully performed, as described with reference to FIG. 1.

The web real-time communicator 115 includes a streaming client (STRC) 115a. The streaming client 115a may request the packetized media data PKMD from the streaming server. The streaming server 113 may capture the encoded media data ECMD using the media capture driver 113a and generate the packetized media data PKMD in response to the request. As such, the streaming client 115a may receive the packetized media data PKMD from the streaming server 113.

The web real-time communicator 115 may depacketize the packetized media data PKMD to obtain the encoded media data ECMD. In one or more exemplary embodiments, the web real-time communicator 115 may read set information, such as configuration files stored in the memory 111 or another internal storage of the source device 110, and may determine which real-time network protocol has been used for the packetized media data PKMD. The web real-time communicator 115 may parse (or identify) the payload of the packetized media data PKMD based on the set information. The web real-time communicator 115 may drop the header of the packetized media data PKMD and obtain the encoded media data ECMD from the payload of the packetized media data PKMD.

The web real-time communicator 115 transports the encoded media data ECMD to the web browser 125 of the sink device 120 to perform WebRTC. The web browser 125 of the sink device 120 may decode the encoded media data ECMD based on the media compression standard determined by the signaling and may render the decoded media data on the display and audio equipment of the sink device 120 when receiving the encoded media data ECMD from the web real-time communicator 115.

The media encoder 112 may be a hardware encoder. In this manner, the memory 111 and the media encoder 112 may be included in a hardware layer, and the streaming server 113 and the web real-time communicator 115 may be included in a software layer. However, the exemplary embodiments of the source device 110 are not limited thereto or thereby. For example, the media encoder 112 may be implemented via software, firmware, or a combination thereof. In this manner, corresponding program codes (or software) may be loaded into the memory 111 or another internal memory of the source device 110, and one or more processors optimized in encoding, may execute the instructions of the program codes to implement the media encoder 112.

Figure 7:
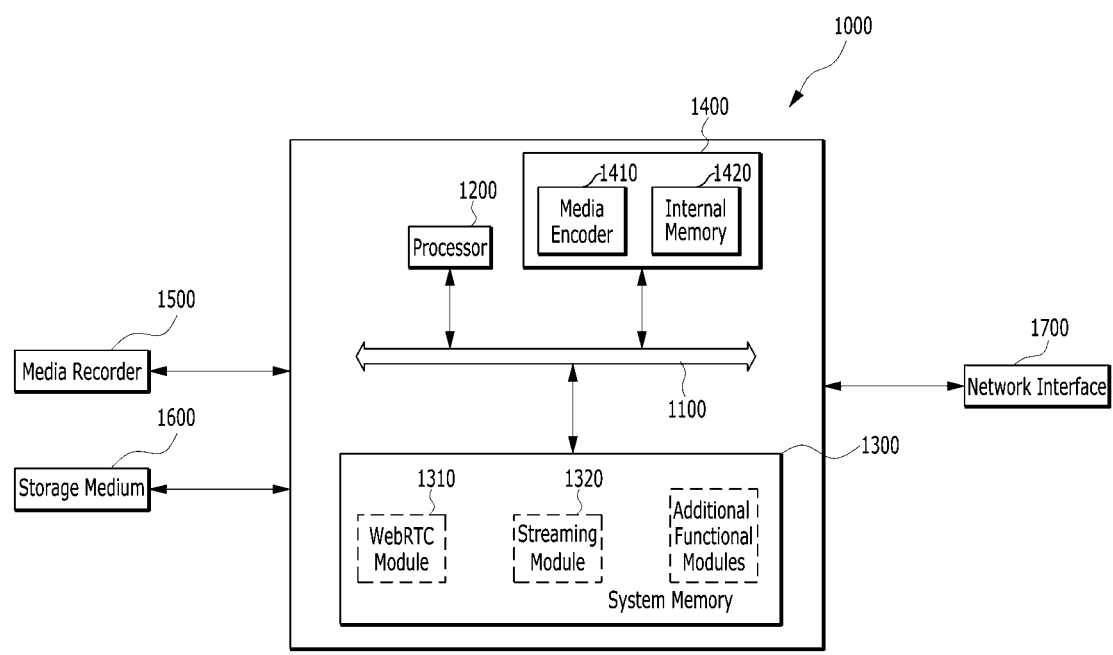
FIG. 7 is a block diagram illustrating an exemplary computer system suitable for implementing exemplary embodiments of the source device.

The web real-time communicator 115 may be implemented via software that is executed by one or more processors (see 1200 in FIG. 7). If the web real-time communicator 115 encodes the media source for WebRTC, relatively many hardware resources are required for encoding the media source. For instance, when the source device 110 includes a processor having relatively low operational performance and the processor executes program codes (or software) to implement the web real-time communicator 115, large portions of hardware resources of the processor may be used for encoding the media source. In this case, WebRTC may not be performed smoothly or efficiently, and overall operational performances of the source device 110 may decrease. For example, the source device 110 may be one of an IP camera, a network video recorder, a web camera, and the like which include the processor having low operational performance.

The media encoder 112 may be the hardware encoder or may be implemented via software executed by one or more processors optimized in encoding so as to provide the improved encoding performance. For instance, the media encoder 112 may be integrated in system on chip ("SoC") that provides functions of encoding media sources, and the SoC may be embedded in the source device 110. According to the illustrated embodiment, the web real-time communicator 115 receives the encoded media data ECMD from the media encoder 112 through the streaming server 113. Accordingly, the web real-time communicator 115 does not need to perform the functions required to encode media, but may obtain the encoded media data ECMD from the streaming server 113 after it has been packetized for efficient delivery. Thus, the web real-time communicator 115 may perform WebRTC efficiently and the source device 110 may have improved encoding efficiency, even though the web real-time communicator 115 is implemented via software and the processor executing the software has relatively low operational performance.

Figure 10:
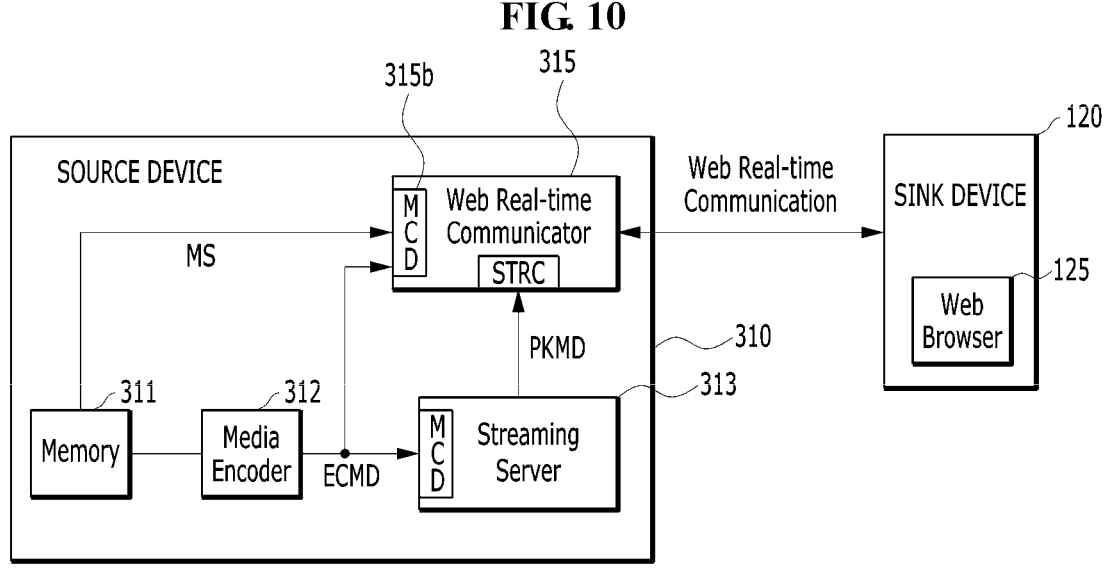
FIG. 10 is a block diagram illustrating still another exemplary embodiment of a source device constructed according to the principles of the invention.

The media encoder 112 may be implemented in various manners and embedded in the source device 110. For example, the media encoder 112 may be one of various hardware encoders or may be implemented via software executed by one or more processors as described above. In this case, if the web real-time communicator 115 directly receives the encoded media data ECMD from the media encoder 112 rather than through the streaming server 113, the web real-time communicator 115 should be designed appropriately to be compatible with various types of media encoders 112 and to be able to request and receive the encoded media data ECMD directly from the media encoder 112. An example of such a system is shown in FIG. 10.

Since the source device 110 includes the streaming server 113 which is able to upload the encoded media data ECMD from the media encoder to a streaming client server coupled to the network 105 such as cloud servers, the streaming server 113 may be also utilized for obtaining the encoded media data ECMD with use of WebRTC. According to the illustrated embodiment, the web real-time communicator 115 requests the packetized media data PKMD from the streaming server 113 and processes the packetized media data PKDM to obtain the encoded media data ECMD. Given that the streaming server 113 packetizes the encoded media data ECMD based on one of real-time network protocols, such as RTP, RTSP, and RTMP, which is generally predetermined, the web real-time communicator 115 may be designed considering the real-time network protocols, thereby improving the compatibility of the web real-time communicator 115. Further, the development costs for the web real-time communicator 115 and the source device 110 including the same may reduce due to the improved compatibility of the web real-time communicator 115 with peer devices.

Figure 3:
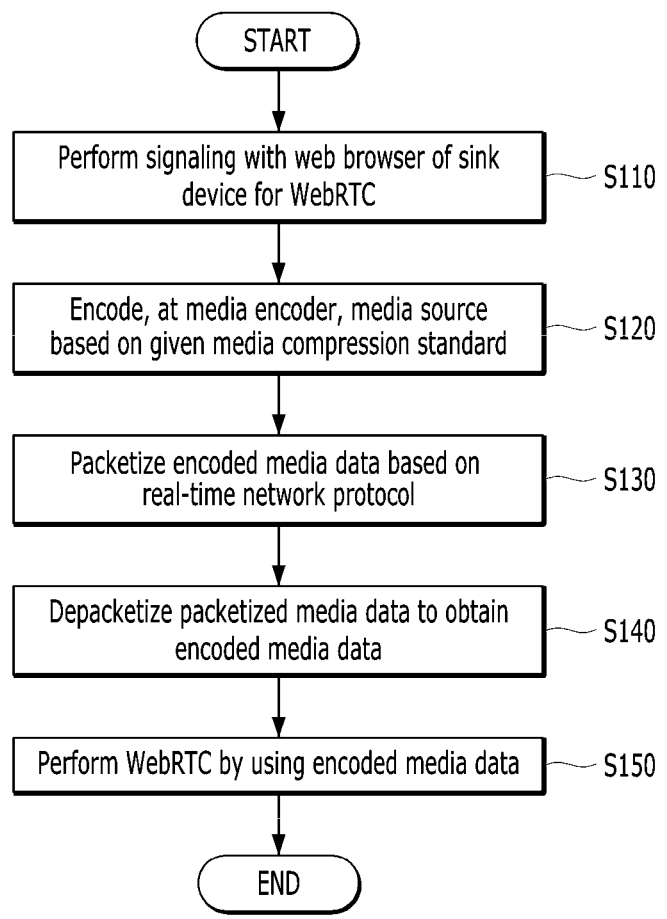
FIG. 3 is a flowchart illustrating an exemplary method of operating the source device according to the principles of the invention.

FIG. 3 is a flowchart illustrating an exemplary method of operating the source device 110 according to the principles of the invention.

Referring to FIGS. 2 and 3, at step S110, a signaling step with the web browser 125 of the sink device 120 is performed. During the signaling, the web real-time communicator 115 negotiates, with the web browser 125 of the sink device 120, a media compression standard which is applied to media data to be transported to the web browser 125. The web real-time communicator 115 may negotiate with the web browser 125 such that the media compression standard supported by the media encoder 112 is selected.

At step S120, a media source is encoded based on a given media compression standard at the media encoder 112. The given media compression standard may be the media compression standard negotiated during the signaling.

At step S130, the encoded media data ECMD is packetized based on a real-time network protocol at the streaming server 113. The streaming server 113 may capture the encoded media data ECMD generated by the media encoder 112 and may packetize the encoded media data ECMD based on a real-time network protocol among several real-time network protocols, such as RTP, RTSP, and RTMP.

At step S140, the packetized media data PKMD is depacketized to obtain the encoded media data ECMD. The web real-time communicator 115 may perform the depacketization (or packet fragmentation) based on the real-time network protocol corresponding to the streaming server 113 and may obtain the encoded media data ECMD from the payload of the packetized media data PKMD.

At step S150, WebRTC is performed with the web browser 125 of the sink device 120 by using the encoded media data ECMD. The web real-time communicator 115 may repacketize the encoded media data ECMD in a certain format of WebRTC, and transport the repacketized media data to the web browser 125 of the sink device 120.

The web browser 125 of the sink device 120 may depacketize the repacketized media data and may decode the encoded media data ECMD to play the media.

Figure 4:
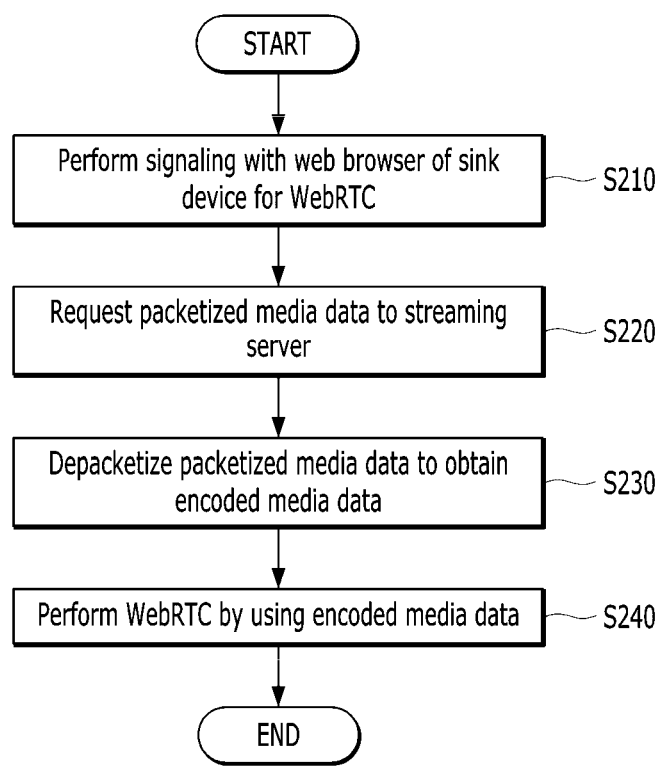
FIG. 4 is a flowchart illustrating an exemplary method of operating the web real-time communicator according to the principles of the invention.
Figure 6:
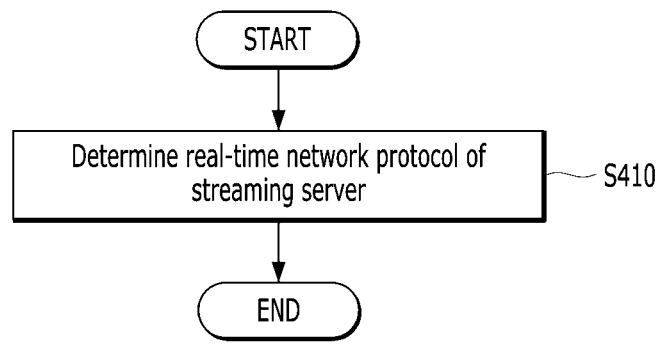
FIG. 6 is a flowchart illustrating an exemplary preparatory operation for receiving and processing the packetized media data.

FIG. 4 is a flowchart illustrating an exemplary method of operating the web real-time communicator 115 according to the principles of the invention. FIG. 5 is a flowchart illustrating exemplary signaling that may be performed to carry out peer to peer WebRTC. FIG. 6 is a flowchart illustrating an exemplary preparatory operation for receiving and processing the packetized media data.

Referring to FIGS. 2 and 4, at step S210, signaling with the web browser of the sink device 120 is performed. In the signaling, the web real-time communicator 115 may exchange messages of the session description protocol with the web browser 125 of the sink device 120. The signaling may be performed after both the web real-time communicator 115 and the web browser 125 access to the signaling server 130.

Referring to FIG. 5, the signaling establishing a media share session for peer to peer communication of WebRTC may include steps S311 to S318. At step S311, the web browser 125 may send an offer of the session description protocol to the signaling server 130, the offer informing media capabilities, such as at least one media compression standard available to the web browser 125 and the resolution of the media data. At step S312, the signaling server 130 may relay the offer from the web browser 125 to the web real-time communicator 115. At step S313, the web real-time communicator 115 may send an answer of the session description protocol to the signaling server 130, the answer informing media capabilities, such as a media compression standard and the resolution available to the web real-time communicator 115 and/or the source device 110. The available media compression standard represented by the answer may include the media compression standard corresponding to the media encoder 112 which is embedded in the source device 110. At step S314, the signaling server 130 may relay the answer to the web browser 125. That is, through steps S311 to S314, the web real-time communicator 115 and the web browser 125 may negotiate the media capabilities of media data including the media compression standard.

At step S315, the web browser 125 may send candidates for identifying the web browser 125 in the network 105, such as IP address and port through which WebRTC is to be performed. At step S316, the signaling server 130 may relay the candidates of the web browser 125 to the web real-time communicator 115. At step S317, the web real-time communicator 115 may also send candidates for identifying the web real-time communicator 115 in the network 105. At step S318, the signaling server 130 may relay the candidates of the web real-time communicator 115 to the web browser 125. In one or more exemplary embodiments, the web real-time communicator 115 and the web browser 125 each may determine the candidates using Session Traversal Utilities for NAT (STUN) servers. For example, the STUN servers may return the candidates in response to requests from the web real-time communicator 115 and the web browser 125. Through steps S315 to S318, each of the web real-time communicator 115 and the web browser 125 may specify the IP address and port through which WebRTC is to be performed.

In the illustrated embodiment, the web browser 125 sends the offer and then the web real-time communicator 115 sends the answer in response to the offer. However, exemplary embodiments are not limited thereto, and steps S311 to S318 may be variously changed. For example, the web real-time communicator 115 may send an offer to start the signaling and the web browser 125 may send an answer in response to the offer.

At step S320, after the signaling is successfully performed, the web real-time communicator 115 and the web browser 125 may perform peer to peer communication based on WebRTC.

Referring back to FIG. 4, at step S220, the packetized media data PKMD is requested from the streaming server 113. The web real-time communicator 115 receives the packetized media data PKMD including encoded media data ECMD form the streaming server 113.

At step S230, the packetized media data is depacketized to obtain the encoded media data ECMD. The web real-time communicator 115 may parse the payload of the packetized media data PKMD based on a real-time network protocol of the streaming server 113 and extract the encoded media data ECMD from the payload.

Before performing step S220 or step S230, referring to FIG. 6, the web real-time communicator 115 may determine the real-time network protocol of the streaming server 113 (S410). Depending on the determination of the real-time network protocol, the web real-time communicator 115 may parse the payload of the packetized media data PKMD. In one or more exemplary embodiments, the web real-time communicator 115 may read set information, such as configuration files, from any kinds of internal storages (see 1300 and 1600 in FIG. 7) of the source device 110 or from any kinds of external storages associated with the source device 110, and may determine the real-time network protocol of the streaming server 113 on the basis of the read set information. In another exemplary embodiment, the web real-time communicator 115 may sequentially call streaming servers under several real-time network protocols and may determine the real-time network protocol of the streaming server 113 according to whether a corresponding response is received or not.

Referring again to FIG. 4, at step S240, WebRTC is performed by using the encoded media data ECMD. The web real-time communicator 115 may transport the encoded media data ECMD to the web browser 125 of the sink device 120.

According to the principles of the invention, the source device 110 including the web real-time communicator 115 may have improved encoding efficiency by using the media data ECMD encoded by the media encoder 112 for WebRTC. Furthermore, the compatibility of the web real-time communicator 115 may be improved by providing the encoded media data ECMD through the streaming server 113.

FIG. 7 is a block diagram illustrating an exemplary computer system 1000 suitable for implementing exemplary embodiments of the source device 110.

Referring to FIG. 7, the computer system 1000 may include a bus 1100, a processor 1200, a system memory 1300, a semiconductor chip 1400, a media recorder 1500, a storage medium 1600, and a network interface 1700.

The bus 1100 or other communication mechanism couples various components of computer system 1000 for communicating data, signals, and information. The processor 1200, which may be any type of general or special purpose processor, may control overall operations of the computer system 1000. The system memory 1300 may store information and instructions to be executed by processor 1200. The system memory 1300 may include any combination of random access memory (RAM), read only memory (ROM), and any other type of computer readable medium.

The semiconductor chip 1400 may be coupled to the bus 1100 and provide encoded media data (see ECMD in FIG. 2). The semiconductor chip 1400 may include a media encoder 1410 encodes a media source. The media source and/or the encoded media data (See ECMD in FIG. 2) may be stored in an internal memory 1420 of the semiconductor chip 1400 or in the system memory 1300 of the computer system 1000. It is contemplated that the internal memory 1420 and/or the system memory 1300 may be provided as the memory 111 shown in FIG. 2.

In one or more exemplary embodiments, the media encoder 1410 may be a hardware encoder. In another exemplary embodiment, the semiconductor chip 1400 may include one or more processors executing program codes corresponding to the media encoder. In this manner, the internal memory 1420 may be provided as a working memory of the one or more processors.

The system memory 1300 may store program codes that provide functionalities when executed by the processor 1200. The program codes may include a WebRTC module 1310 for providing functionalities of processing the packetized media data (PKMD in FIG. 2), transporting the encoded media data to an external web browser (see 120 in FIG. 2), and all other functionalities disclosed herein. The WebRTC module 1310 may provide functionalities of the web real-time communicator 115 shown in FIG. 2 when executed by the processor 1200. The program codes may further include a streaming module 1320 for providing functionalities of the streaming server 1320 shown in FIG. 2 when executed by the processor 1200. The program codes may further include one or more additional functional modules for providing additional functionalities. In one or more exemplary embodiments, the program codes may further include operating system module that provide operating system functionality for the computer system 1000.

The media recorder 1500 records images and/or sound to provide video data and/or audio data. The video data and/or the audio data may be processed by the processor 1200 to provide the media source. Although FIG. 7 shows that the media recorder 1500 is included in the computer system 1000, the exemplary embodiments are not limited thereto or thereby. For instance, the media recorder may be separated from the computer system 1000, but may communicate with network. In this manner, the computer system 1000 may receive the video data and/or audio data from the separated media recorder via the network interface 1700.

The storage medium 1600 may be any available media that can be accessed by processor 1200. The storage medium 1600 may include nonvolatile storage, such as a memory card. For example, the storage medium 1600 may include at least one of a compact flash (CF) card, a smart media (SM) card, a memory stick, a multi media card (MMC), a secure digital (SD) card, a universal flash storage (UFS), and the like. The storage medium 1600 may include removable and non-removable storages.

The network interface 1700 (or transceiver) transmits and receives signals between computer system 1000 and other devices via network. The network may be a single network or a combination of multiple networks. For example, the network may include public network, one or more private networks, wireless networks, and/or other appropriate types of networks accessible by the computer system 1000 and the various components of the network system 100 of FIG. 1.

In one or more exemplary embodiments, the computer system 1000 may further include an input/output component that processes a user action, such as selecting keys from a keypad, selecting buttons, image, etc., and sends a corresponding signal to the bus 1100.

Figure 8:
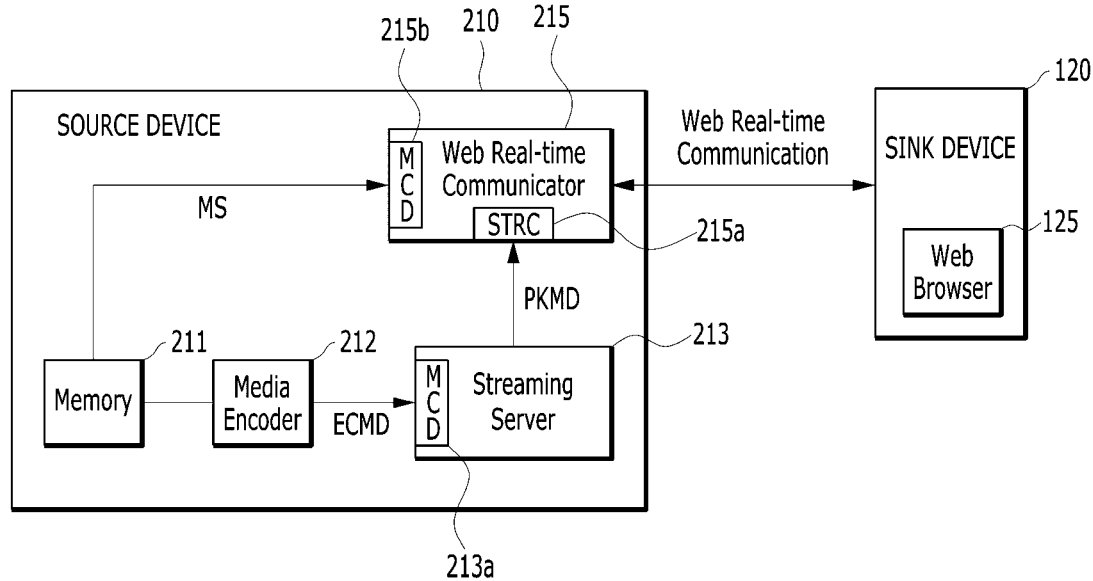
FIG. 8 is a block diagram illustrating another exemplary embodiment of a source device constructed according to the principles of the invention.

FIG. 8 is a block diagram illustrating another exemplary embodiment of a source device 210 constructed according to the principles of the invention.

Referring to FIG. 8, the source device 210 includes a memory 211, a media encoder 212, a streaming server 213, and a web real-time communicator 215. The memory 211, the media encoder 212, and the streaming server 213 may be configured the same as the memory 111, the media encoder 112, and the streaming server 113 described with reference to FIG. 2. Accordingly descriptions of these components are unnecessary and will be omitted for clarity and conciseness.

A media compression standard which does not correspond to the media encoder 212 may be selected when the web real-time communicator 215 performs a signaling with a web browser 125 of a sink device 120. For example, in case where the web browser 125 of the sink device 120 does not support a media compression standard which is supported by the media encoder 212, the web real-time communicator 215 cannot negotiate with the web browser 125 such that the media compression standard supported by the media encoder 212 is selected. In this case, another media compression standard not corresponding to the media encoder 212 may be selected.

According to the illustrated embodiment, the web real-time communicator 215 requests packetized media data PKMD from the streaming server 213 depending on the signaling result.

A streaming client 215a of the web real-time communicator 215 requests the packetized media data PKMD from the streaming server 213 when the media compression standard corresponding to the streaming server 213 is selected during the signaling. In response to the request, the streaming server 213 captures encoded media data ECMD provided by the media encoder 212 by using a media capture driver 213a and generates the packetized media data PKMD. The web real-time communicator 215 may receive the packetized media data PKMD through the streaming client 215a and may perform WebRTC using the packetized media data PKMD.

The web real-time communicator 215 may receive a media source MS directly from the memory 211 when another media compression standard, which does not correspond to the streaming server 213, is selected during the signaling. The web real-time communicator 215 may also include a media capture driver 215b. The media capture driver 215b of the web real-time communicator 215 may capture the media source MS from the memory 211. The web real-time communicator 215 may encode the media source MS based on another media compression standard selected during the signaling. The web real-time communicator 215 may perform WebRTC using the encoded media data based on the other media compression standard.

Figure 9:
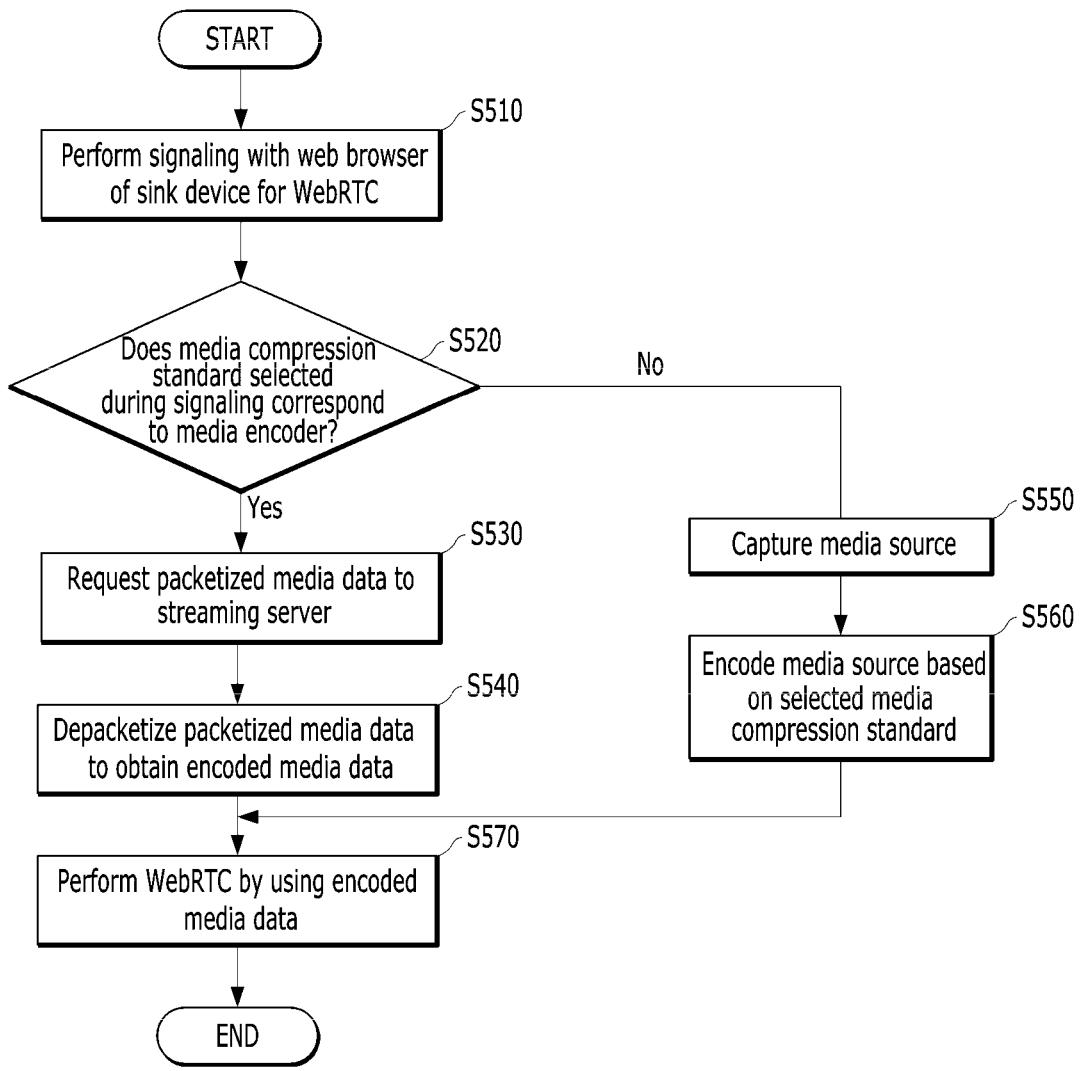
FIG. 9 is a flowchart illustrating another exemplary method of operating the web real-time communicator according to the principles of the invention.

FIG. 9 is a flowchart illustrating another exemplary method of operating the web real-time communicator 215 according to the principles of the invention.

Referring to FIGS. 8 and 9, at step S510, signaling with the web browser 125 of the sink device 120 is performed. The media compression standard to be applied to media data is selected during the signaling.

At step S520, whether the media compression standard selected during the signaling corresponds to the media encoder 212 or not is determined. When the selected media compression standard corresponds to the media encoder 212, the media source may be encoded by the media encoder 212, which has a relatively high processing speed. In one or more exemplary embodiments, the media compression standard corresponding to the media encoder 212 may be at least one of video compression standards H.263, H.264, and H.265. As such, steps S530 and S540 may be performed when the media compression standard selected during the signaling corresponds to the media encoder 212. Steps S530 and S540 are described the same as steps S220 and S230 in FIG. 4.

At step S550, the media source may be captured when the media compression standard selected during the signaling does not correspond to the media encoder 212. At step S560, the captured media source is encoded based on the selected media compression standard. For example, the media compression standard which is encoded by the web real-time communicator 215 may be one of video compression standards VP8, VP9, and AV1.

At step S570, WebRTC is performed by using the encoded media data. The web real-time communicator 215 may transport the encoded media data to the web browser 125 of the sink device 120.

According to the illustrated embodiment, the web real-time communicator 215 may encode the media source for WebRTC when the media compression standard selected during the signaling does not correspond to the media encoder 212. Accordingly, a source device having the relatively high compatibility for various web browsers of sink devices may be provided.

FIG. 10 is a block diagram illustrating still another exemplary embodiment of a source device 310 constructed according to the principles of the invention.

Referring to FIG. 10, the source device 310 includes a memory 311, a media encoder 312, a streaming server 313, and a web real-time communicator 315. The memory 311, the media encoder 312, and the streaming server 313 may be configured the same as the memory 111, the media encoder 112, and the streaming server 113 described with reference to FIG. 2. Accordingly descriptions of these components are unnecessary and will be omitted for clarity and conciseness.

The web real-time communicator 315 may be configured to be the same as the web real-time communicator 215 described with reference to FIG. 8 except for further receiving encoded media data ECMD from the media encoder 312. The web real-time communicator 315 may be designed to be able to access to at least one of various types of media encoders. In this manner, a media capture driver 315b of the web real-time communicator 315 may capture the encoded media data ECMD from the media encoder 312 when the media encoder 312 is accessible.

Figure 11:
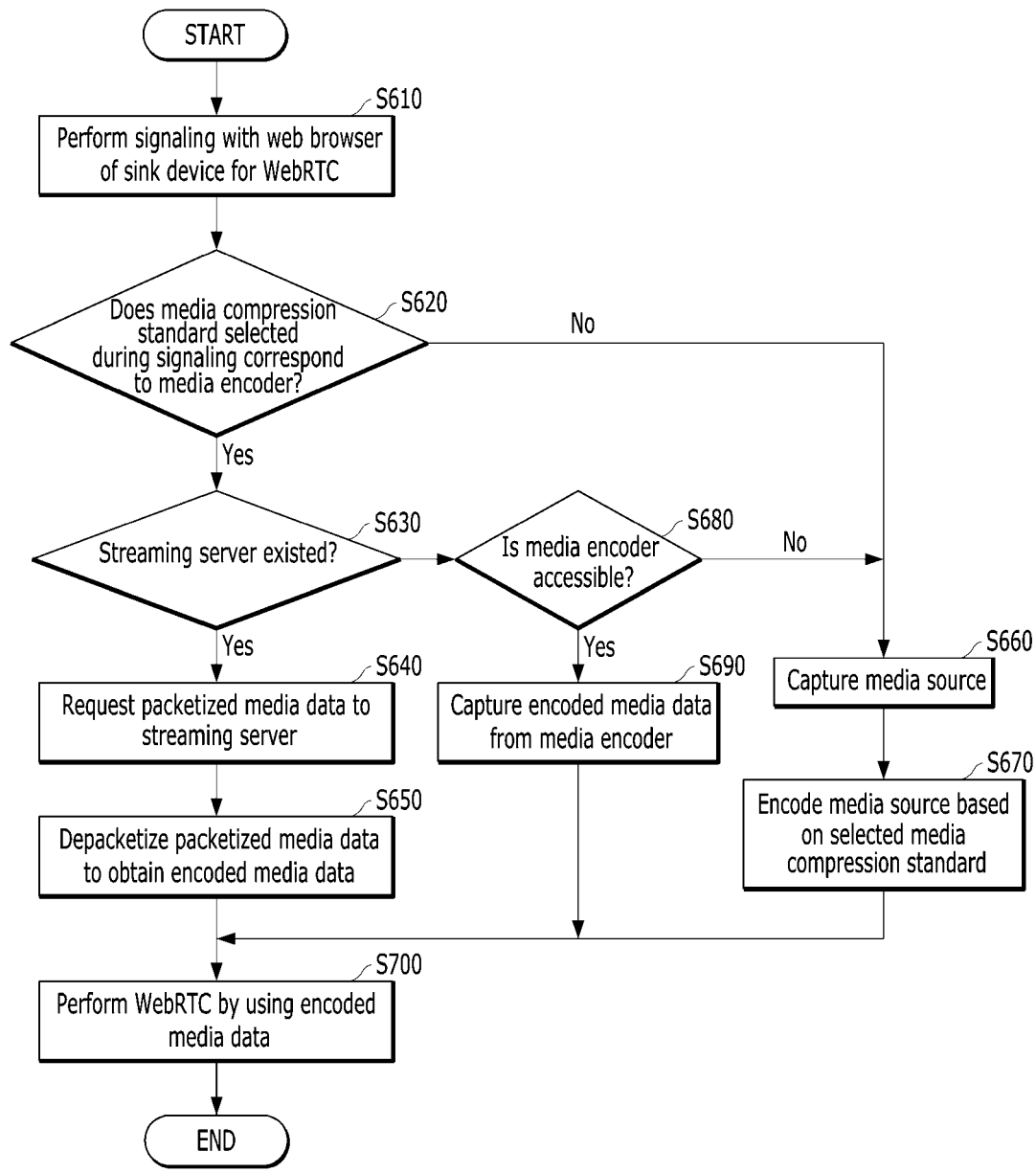
FIG. 11 is a flowchart illustrating still another exemplary method of operating the web real-time communicator according to the principles of the invention.

FIG. 11 is a flowchart illustrating still another exemplary method of operating the web real-time communicator 315 according to the principles of the invention.

Referring to FIGS. 10 and 11, at step S610, signaling with the web browser 125 of the sink device 120 is performed.

At step S620, whether the media compression standard selected during the signaling corresponds to the media encoder 312 or not is determined. If so, step S630 is performed. At step S630, whether a streaming server 313 exists or not is determined. For example, as similar to the description with reference to FIG. 6, the web real-time communicator 315 may read set information or sequentially call streaming servers under the several real-time network protocols to determine whether the streaming server 313 exists or not. Steps S640 and S650 are performed when the streaming server 313 exists. Steps S640 and S650 are described the same as steps S220 and S230 in FIG. 4.

Steps S660 and S670 are performed when the selected media compression standard does not correspond to the media encoder 312. Steps S660 and S670 are described the same as steps S550 and S560 in FIG. 9.

At step S680, whether the media encoder 312 is accessible or not is determined. At step S690, the encoded media data ECMD is captured from the media encoder 312 when the media encoder 312 is accessible. In more detail, the web real-time communicator 315 may be designed to be able to access to at least one of various types of media encoders and may capture the encoded media data ECMD when the streaming server 313 does not exist but the media encoder 312 is included in the at least one of various types of media encoders. For example, the web real-time communicator 315 may read set information from internal storages of the source device 310 or from external storages associated to the source device 310, or may sequentially call one or more types of media encoders to determine whether the source device 310 includes the accessible media encoder.

At step S700, WebRTC is performed by using the encoded media data.

According to the principles of the invention, the web real-time communicator 315 may capture the encoded media data ECMD from the media encoder 312 when the media encoder 312 is accessible. Accordingly, the source device 310 including the web real-time communicator 315 may have improved encoding efficiency although the source device 310 does not include the streaming server 313, thereby improving the compatibility of the web real-time communicator 315 for various source devices.

Figure 12:
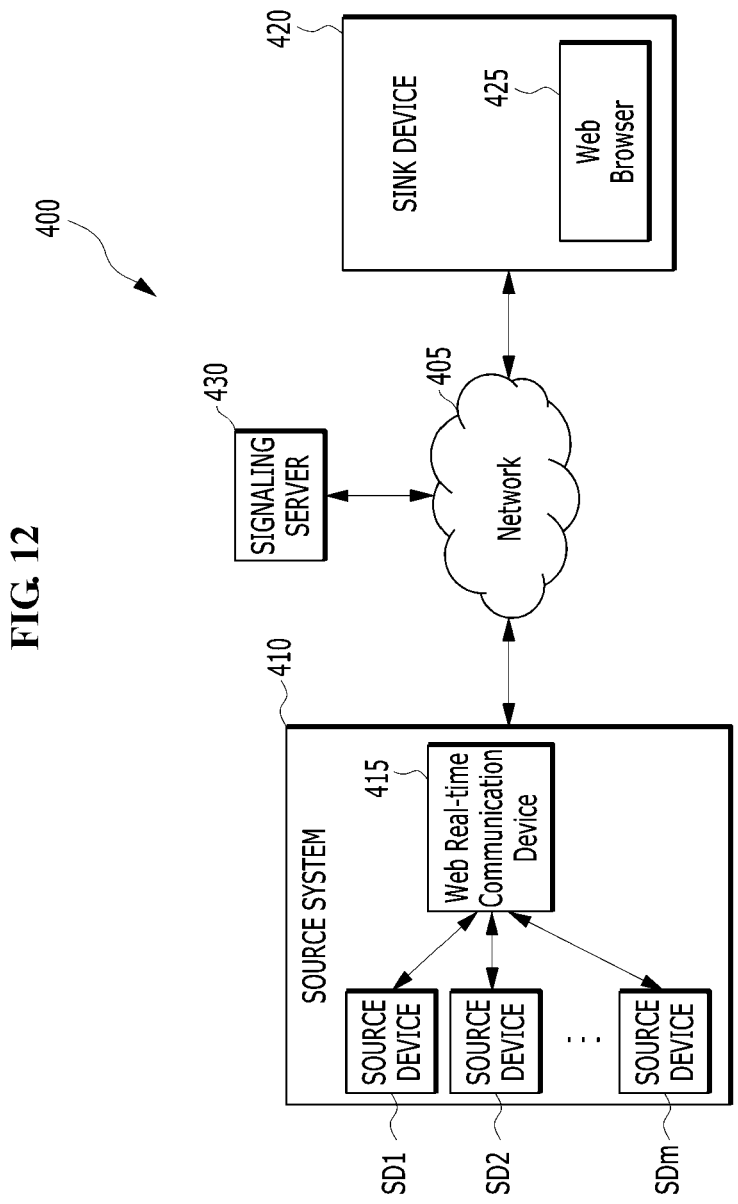
FIG. 12 is a block diagram illustrating an exemplary network system including a source system.

FIG. 12 is a block diagram illustrating an exemplary network system 400 including a source system 410.

Referring to FIG. 12, the source system 410 may be coupled to a sink device 420 and a signaling server 430 via a network 405.

The source system 410 includes one or more source devices SD1 to SDm that provides media sources and a web real-time communication device 415 that communicates with the one or more source devices SD1 to SDm. The web real-time communication device 415 provides WebRTC functionality to the first to m-th source devices SD1 to SDm. The web real-time communication device 415 performs signaling with a web browser 425 of the sink device 420 through the signaling server 430.

The web real-time communication device 415 may be coupled to the first to m-th source devices SD1 to SDm through private network behind, for example, routers. Therefore, the web real-time communication device 415 may request the packetized media data from each of the first to m-th source devices SD1 to SDm after the signaling is performed. In response to the request, the first to m-th source devices SD1 to SDm each may provide packetized media data, which includes encoded media data, to the web real-time communication device 415.

Figure 13:
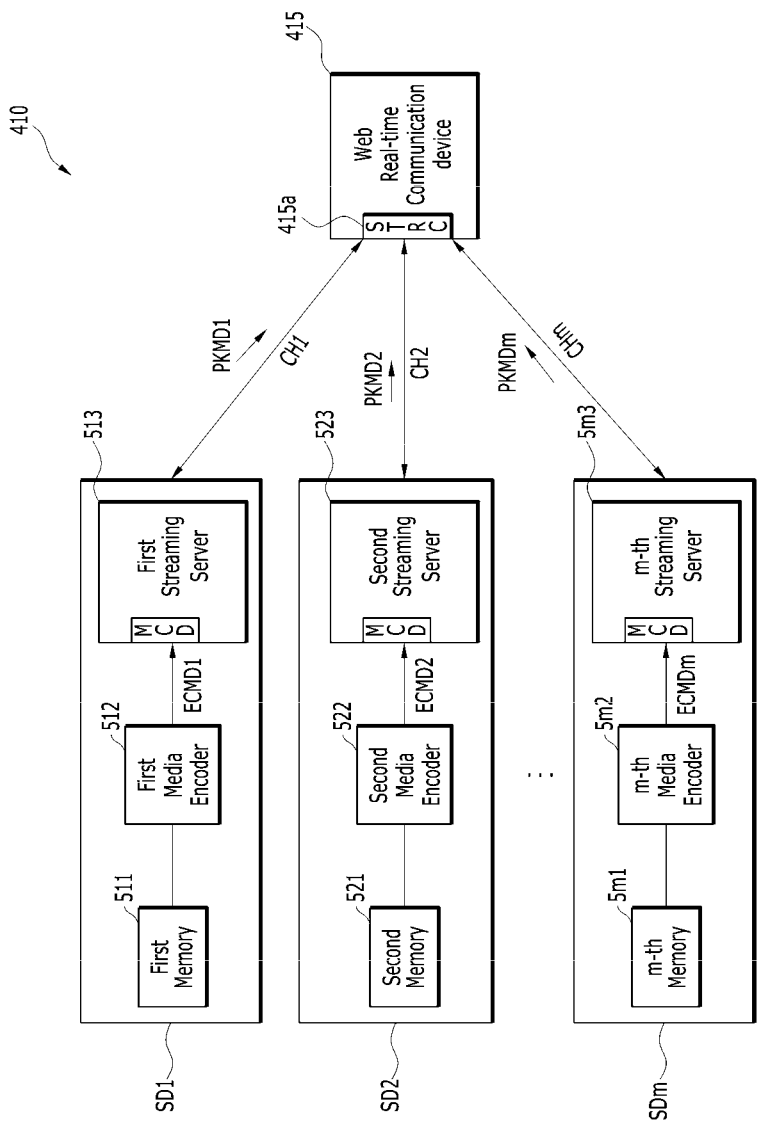
FIG. 13 is a black diagram illustrating an exemplary embodiment of the source system constructed according to the principles of the invention.

FIG. 13 is a black diagram illustrating an exemplary embodiment of the source system 410 constructed according to the principles of the invention.

Referring to FIG. 13, each of first to m-th source devices SD1 to SDm may include a memory, a media encoder, and a streaming server. The first source device SD1 includes a first memory 511, a first media encoder 512, and a first streaming server 513. The second source device SD2 includes a second memory 521, a second media encoder 522, and a second streaming server 523. The m-th source device SDm includes an m-th memory 5m1, an m-th media encoder 5m2, and an m-th streaming server 5m3.

The web real-time communication device 415 may communicate to the first to m-th streaming servers 513 to 5m3 through first to m-th channels CH1 to CHm, respectively. The web real-time communication device 415 and the source devices SD1 to SDm may include network ports for coupling to the first to m-th channels CH1 to CHm.

The web real-time communication device 415 may request packetized media data from the streaming server of the source device after the corresponding signaling is performed. The media encoder of the source device, which receives the request, encodes a media source of the memory and generates encoded media data. The corresponding streaming server packetizes the encoded media data and transports the packetized media data to a streaming client 415a of the web real-time communication device 415. FIG. 13 shows that the first to m-th media encoder 512 to 5m2 provide first to m-th encoded media data ECMD1 to ECMDm, respectively, and the first to m-th streaming servers 513 to 5m3 transport first to m-th packetized media data PKMD1 to PKMDm to the web real-time communication device 415, respectively. The web real-time communication device 415 may process the received packetized media data and may transport the encoded media data to the web browser 425 of the sink device 420 to perform WebRTC.

In one or more exemplary embodiments, the web real-time communication device 415 may receive information of real-time network protocols of the first to m-th streaming server 513 to 5m3 from the first to m-th source devices SD1 to SDm before receiving the first to m-th packetized media data PKMD1 to PKMDm.

Figure 14:
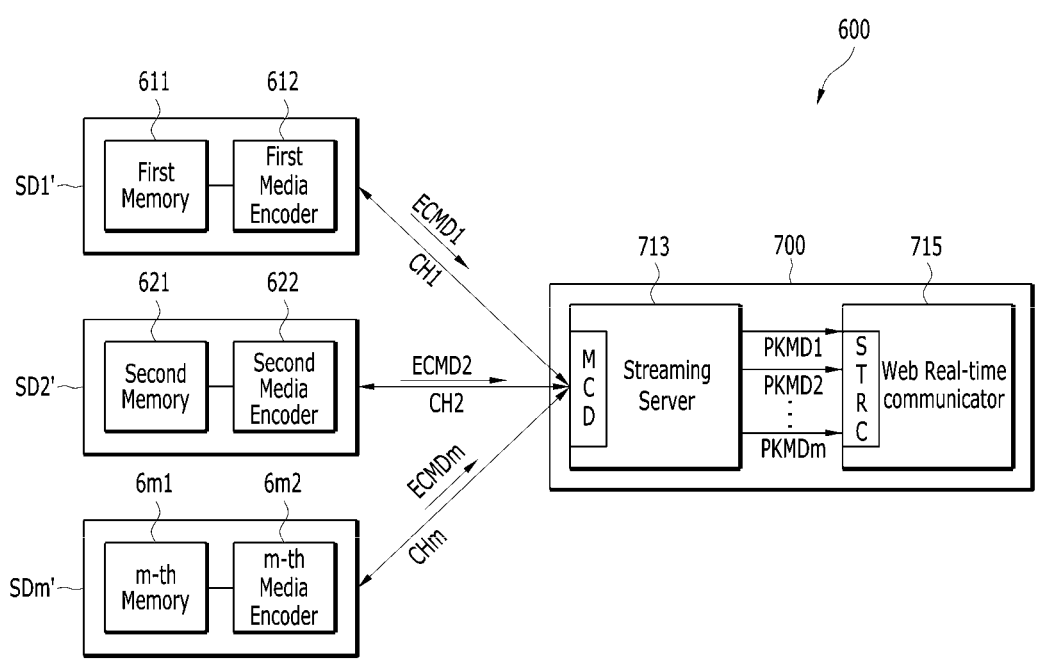
FIG. 14 is a block diagram illustrating a modified embodiment of the source system of FIG. 13.

FIG. 14 is a block diagram illustrating a modified embodiment 600 of the source system 410 of FIG. 13.

Referring to FIG. 14, each of first to m-th source devices SDP to SDm' may include a memory and a media encoder. The first source device SDP includes a first memory 611 and a first media encoder 612, the second source device SD2' includes a second memory 621 and a second media encoder 622, and the m-th source device SDm' includes an m-th memory 6m1 and an m-th media encoder 6m2.

A streaming server 713 may be incorporated in the web real-time communication device 700. The streaming server 713 of the web real-time communication device 700 may communicate to the first to m-th source devices SDP to SDm' through first to m-th channels CH1 to CHm, respectively. The streaming server 713 receives first to m-th encoded media data ECMD1 to ECMDm through the first to m-th channels CH1 to CHm, respectively, and provides first to m-th packetized media data PKMD1 to PKMDm to a web real-time communicator 715 of the web real-time communication device 700.

In one or more exemplary embodiments, the source devices SD1 to SDm and SD1' to SDm' and the web real-time communication devices 415 and 700 in FIGS. 12 and 13 may be implemented via the computer system 1000 described with reference to FIG. 7. In this manner, the source devices SD1 to SDm and SDP to SDm' may selectively include the streaming module 1320 according to the illustrated embodiments shown in FIGS. 12 and 13. The web real-time communication devices 415 and 700 may not include the semiconductor chip 1400 and may selectively include the streaming module 1320 according to the illustrated embodiments in FIGS. 12 and 13. In one or more exemplary embodiments, functionalities of the web real-time communication devices 415 and 700 may be provided by a hardware device.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method of performing real-time communication with an external web browser, the method comprising the steps of:
    signaling an external web browser to initiate real-time communication over a network;
    packetizing encoded media data in a source device based on a given real-time network protocol after the signaling is performed;
    depacketizing the packetized media data in the source device to obtain the encoded media data; and
    performing the real-time communication by transporting the encoded media data obtained by depacketizing the packetized media data in the depacketizing step to the external web browser over the network.

2. The method of claim 1, wherein the step of depacketizing of the packetized media data comprises obtaining the encoded media data from a payload of the packetized media data.

3. The method of claim 2, further comprises the step of:
    reading set information stored in an internal storage to determine the given real-time network protocol,
    wherein the payload of the packetized media data is identified depending on the determined real-time network protocol.

4. The method of claim 1, wherein the step of performing of the real-time communication comprises:
    repacketizing the encoded media data; and
    transporting the repacketized media data including the encoded media data to the external web browser.

5. The method of claim 1, further comprises the step of:
    encoding the media source to generate the encoded media data by using a hardware media encoder.

6. The method of claim 1, wherein the real-time communication comprises web real-time communication (WebRTC).

7. The method of claim 1, wherein the given real-time network protocol is one of a real-time transport protocol (RTP), a real-time streaming protocol (RTSP), and a real-time messaging protocol (RTMP).

8. The method of claim 1, wherein the encoded media data is based on one of video compression standards H.263, H.264, H.265, VP8, VP9, and AOMedia Video 1 (AV1).

9. A method of performing a web real-time communication with an external web browser, the method comprising the steps of:
    signaling an external web browser to initiate web real-time communication;
    requesting a packetized media data from a streaming server in a source device based upon the response to the signaling step, the packetized media data including media data that is encoded based on a given media compression standard;
    depacketizing the packetized media data in the source device to obtain the encoded media data; and
    performing the web real-time communication by transporting the encoded media data obtained by depacketizing the packetized media data in the depacketizing step to the external web browser.

10. The method of claim 9, further comprises the step of:
    receiving information of a real-time network protocol corresponding to the streaming server from an external source device associated to the streaming server,
    wherein:
    the encoded media data is obtained from a payload of the packetized media data; and
    the payload of the packetized media data is identified depending on the received information.

11. The method of claim 9, further comprises the step of:
    reading set information stored in an internal storage to determine a real-time network protocol corresponding to the streaming server,
    wherein:
    the encoded media data is obtained from a payload of the packetized media data; and
    the payload of the packetized media data is identified depending on the determined real-time network protocol.

12. The method of claim 9, wherein the packetized media data is requested when the signaling result indicates that the external web browser supports the given media compression standard.

13. The method of claim 12, wherein the given media compression standard is one of video compression standards H.263, H.264, H.265.

14. The method of claim 12, further comprises the step of:
    receiving a media source when the signaling result indicates that the external web browser supports another media compression standard different from the given media compression standard,
    wherein the encoded media data included in the packetized media data is generated by encoding the media source based on the given media compression standard.

15. The method of claim 14, further comprises the steps of:
    encoding the media source based on the other media compression standard; and
    performing the web real-time communication by transporting the encoded media source based on the other media compression standard to the external web browser.

16. A source device to perform web real-time communication with an external web browser, the source device comprising:
    a media encoder configured to process a media source to generate encoded media data; and at least one processor configured to:
- signal an external web browser to initiate the web real-time communication;
- packetize the encoded media data based on a given real-time network protocol based upon the response to signaling the external web browser;
- depacketize the packetized media data to obtain the encoded media data; and
- perform the web real-time communication by transporting the encoded media data obtained by depacketizing the packetized media data to the external web browser.

17. The source device of claim 16, wherein:

the encoded media data is based on a first media compression standard; and the at least one processor is configured to:
- packetize the encoded media data when the signaling result indicates that the external web browser supports the first media compression standard.

18. The source device of claim 17, wherein the at least one processor is further configured to:
- receive the media source to perform the web real-time communication when the signaling result indicates that the external web browser supports a second media compression standard different from the first media compression standard.

19. The source device of claim 18, wherein the at least one processor is further configured to:
- encode the received media source based on the second media compression standard; and
- perform the web real-time communication using the encoded media data based on the second media compression standard.

20. The source device of claim 18, wherein the at least one processor is configured to:
- obtain the encoded media data from a payload of the packetized media data; and
- transport the encoded media data to the external web browser to perform the web real-time communication.

* * * * *